United States Patent Office 2,808,422
Patented Oct. 1, 1957

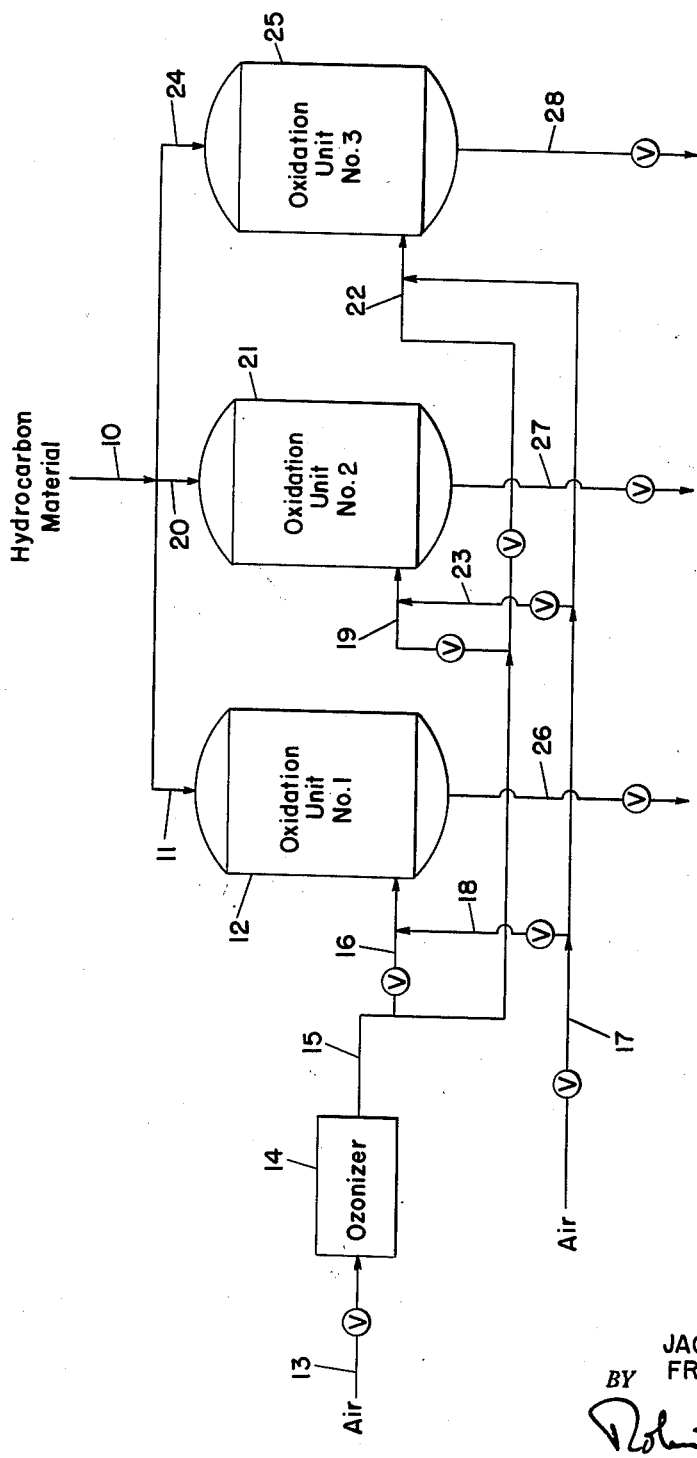

2,808,422
PARTIAL OXIDATION OF HYDROCARBONS

Jack F. Ritter, Wilmington, Del., and Frank R. Shuman, Swarthmore, Pa., assignors to Sun Oil Company, Philadelphia, Pa., a corporation of New Jersey Application July 31, 1953, Serial No. 371,440

4 Claims. (Cl. 260—451)

This invention relates to the partial oxidation of hydrocarbon materials, and more particularly to a method for partially oxidizing hydrocarbon materials which are relatively refractory to oxidation.

In the partial oxidation of hydrocarbon materials, such as petroleum fractions, to obtain carboxylic acid products, various charge materials differ in their ease of oxidation and many charge materials are sufficiently difficult to oxidize that a satisfactory partial oxidation thereof cannot be obtained, for example, in a non-catalytic oxidation with ordinary air as oxidizing agent. Some of these more difficultly oxidized charge materials can, however, be satisfactorily partially oxidized if a catalyst is employed such as manganese naphthenate, etc., or if an ozone-containing material is employed as the oxidizing agent. However, it would be preferable to eliminate the necessity of using a catalyst or ozone in the partial oxidation of such refractory charge materials.

According to the present invention, it has been found possible to perform a partial oxidation of a refractory charge stock as described above, the oxidation being conducted with ordinary air during a substantial portion of the oxidation. According to the invention, the charge material is initially partially oxidized with an ozone-containing gas to obtain partial oxidation products, and the charge material containing those products is then subjected to further oxidation in the absence of ozone. It has been found that, surprisingly, a highly satisfactory rate of oxidation can be obtained in such further oxidation, even though the charge material could not have been initially oxidized satisfactorily in the absence of ozone under the other conditions employed.

In the initial ozonization part of the process, ozonized air can be advantageously used as oxidizing agent. Ozonized air can be suitably prepared by passing air through an ozone-generating apparatus of known type. The air should have low humidity prior to introduction into the ozonizer, in order to prevent arcing. In the part of the process where air substantially free of ozone is used as oxidizing agent, the air need not have low humidity.

According to the present invention, an oxidation is begun with ozone and continued in the absence of ozone. If desired, the use of ozone in the oxidation of a given charge material can be re-commenced after an intermediate period wherein ozone is absent. On the other hand, the oxidation can if desired be carried to completion in the absence of ozone after initiating the oxidation with ozone.

The process of the present invention is advantageous for the oxidation of hydrocarbons generally, whether the latter could be partially oxidized initially in the absence of ozone or not, but it is particularly advantageous when used with the more refractory charge materials. The process is used to particular advantage in the non-catalytic oxidation of microcrystalline waxes which could not be initially non-catalytically oxidized satisfactorily in the absence of ozone.

Other petroleum fractions can be treated in a similar way with advantageous results, e. g. paraffin wax, lubricating oil, foots oil, gas oil, etc. Some fractions which are refractory to oxidation because of high aromatic hydrocarbon contents can advantageously be oxidized according to the invention, though it is preferred according to the invention to employ as oxidation charge materials petroleum fractions which have relatively low aromatic contents, e. g. solvent-refined petroleum fractions.

The initial oxidation according to the invention is preferably continued in the presence of ozone until the saponification number of the oxidation charge has increased at least 10 mg. of KOH per gram, e. g. from 0 to 10 mg. of KOH per gram. More preferably the initial oxidation in the presence of ozone is continued until the saponification number increase has increased at least 40 mg. of KOH per gram before commencing the oxidation in the absence of ozone.

Oxidation according to the invention is preferably performed at a temperature in the range from 200° F. to 300° F. and at atmospheric or elevated pressure preferably not exceeding 500 p. s. i. g. The oxidation may be conducted in the presence of an added catalyst such as a catalyst of the well-known type comprising metal soap of a carboxylic acid. However, an added catalyst is generally not required for satisfactory results, and an advantage of the present invention resides in the ability to achieve satisfactory results without an added catalyst. In the case of microcrystalline wax, oxidation without an added catalyst, using ozone in the initial stages, has been found to produce a lighter and brighter product than that obtained using an added catalyst.

The process of the present invention can be used with particular advantage in a process employing a plurality of oxidation units and one ozonizer to supply ozone to all of the oxidation units. An oxidation of a first charge material can be begun in one oxidation unit, passing the air through the ozonizer before introduction into that oxidation unit. When the oxidation has proceeded to a certain point, the oxidation in that oxidation unit can be continued with air that has not been ozonized. An oxidation of a separate, second charge material in a second oxidation unit can then be begun using air which has passed through the ozonizer. This procedure can be repeated until all of the oxidation units are operating, each in a different stage of oxidation. When the last oxidation has been begun, the ozonizer can then be used to start a new oxidation in the first oxidation unit, and so on. In this way, one ozonizer of relatively small capacity can be used to initiate oxidation of large amounts of oxidation charge material.

The invention will be further described with reference to the attached drawing, which is a schematic diagram of one embodiment of the method of the invention. In the method illustrated, hydrocarbon material, e. g. petroleum microcrystalline wax, is introduced through lines 10 and 11 into oxidation unit 12. Dehumidified air is passed through line 13 into ozonizer 14, which may be of any suitable known type. Air containing, for example, about 0.5 percent ozone is withdrawn from ozonizer 14 and introduced through lines 15 and 16 into oxidation unit 12, wherein it is contacted under partial oxidation conditions with the hydrocarbon material therein, the latter material being in liquid phase. When the oxidation has proceeded to the desired extent, e. g. to a saponification number of about 50 mg. of KOH per gram, the flow of ozonized air through line 16 is terminated, and air substantially free of ozone, which air does not need to be dehumidified, is introduced into oxidation unit 12 through lines 17 and 18, and the oxidation in zone 12 continues. The flow of ozonized air is diverted from line 16 into line 19 and thence into oxidation unit 21, into which hydrocarbon material has previously been introduced through lines 10 and 20. The ozonized air and hydrocarbon material are contacted under partial oxidation conditions in unit 21. When the oxidation has proceeded to the desired extent, the flow of ozonized air is diverted from line 19 to line 22, and introduction of air free of ozone is begun through line 23. Partial oxidation of hydrocarbon material, introduced through lines 10 and 24 into oxidation unit 25, is begun in the latter unit. When the oxidation has proceeded to the desired extent, flow of ozonized air is diverted from line 22 to line 16. In the meantime, flow of unozonized air into oxidation unit 12 through line 18 has been terminated, oxidation products have been discharged through line 26, and fresh hydrocarbon material introduced through line 11. The next step in the cycle involves cessation of unozonized air introduction into unit 21, removal of oxidation products through line 27, introduction of fresh hydrocarbon material through line 20 and diversion of ozonized air from line 16 to line 19. The next step in the cycle involves cessation of unoxidized air introduction into unit 25, removal of oxidation products through line 28, introduction of fresh hydrocarbon material through line 24, and diversion of ozonized air from line 19 to line 22. The cyclic operation is then continued, with ozonized air being introduced into one oxidation zone and unozonized air into another oxidation unit or both of the others, and fresh hydrocarbon charge being introduced into each oxidation unit before commencing introduction of ozonized air thereinto.

It is to be understood that plural oxidation units are not necessary to this invention, though they can be used to advantage. If plural units are used, any suitable number can be provided. Furthermore, the timing of the various cycles need not follow the exact system described in connection with the drawing.

Alternatively to the procedure described in connection with the drawing, a single charge material can be transported through a plurality of separate oxidation zones, in the first of which the charge material is oxidized in the presence of ozone, oxidation in the absence of ozone being effected in the oxidation zone or zones into which the charge material is subsequently introduced.

The following example illustrates the invention:

100 pounds of petroleum microcrystalline wax were partially oxidized at 250° F. by contact in liquid phase with air, the latter being bubbled through the wax at a rate of 5.6 cubic feet per minute. The oxidation was run at approximately atmospheric pressure. No added catalyst was present during the oxidation. The properties of the wax prior to oxidation were determined and are recorded in the table below. The properties of the oxidized wax were determined at two intervals during the oxidation and are also recorded in the table below.

During the first 16.5 hours of oxidation, the air used contained about 0.4 volume percent of ozone, the latter having been generated by passage of dehumidified air through an ozone generator prior to introduction into the oxidation vessel. After 16.5 hours, the passage of the air through the ozone generator was discontinued, and the air, containing no ozone, was passed directly into the oxidation vessel during the period from 16.5 to 24 hours.

The following table shows the results obtained, the first horizontal line showing the properties of the wax prior to oxidation, and the lower horizontal lines showing the properties of the oxidized wax at the indicated times:

| Time in Hours | Sap. No. in mg. KOH/g. | Acid No. in mg. KOH/g. |
|---|---|---|
| 0 | 0 | 0 |
| 19 | 85 | 31 |
| 24 | 91 | 39 |

This table shows that during the period from 19 to 24 hours, when the air contained no ozone, the oxidation continued, since saponification number and acid number continued to increase, indicating that carboxylic materials were being formed. By way of contrast, in an oxidation of 760 grams (1.67 pounds) of the same charge material at 240–260° F. and atmospheric pressure with 3 liters (0.106 cubic feet) per minute of air, which from the beginning of the process contained no ozone, no substantial oxidation could be obtained in 14½ hours, the oxidation charge having saponification number and acid number of zero after 14½ hours of contact with air. This latter experiment was conducted in the presence of 40 grams of previously oxidized microcrystalline wax having saponification number of 84. Comparison of the results of this experiment with that of the previously described oxidation according to the invention shows that oxidation according to the invention is capable of producing oxidation in the absence of ozone after having commenced the oxidation in the presence of ozone, though satisfactory initial oxidation in the absence of ozone could not be obtained.

The invention claimed is:

1. Method for partially oxidizing hydrocarbon materials which comprises: contacting such material in liquid phase with a free-oxygen containing gas under partial oxidation conditions in the presence of ozone until the saponification number of the partially oxidized hydrocarbon materials is at least about 10 mg. of KOH per gram; and then continuing the oxidation by contacting the liquid materials with a free-oxygen containing gas under partial oxidation conditions in the absence of ozone.

2. Method according to claim 1 wherein said material is microcrystalline petroleum wax.

3. Method for partially oxidizing microcrystalline wax which comprises: contacting microcrystalline wax in liquid phase with a free-oxygen containing gas in the presence of ozone and in the absence of an added oxidation catalyst, under conditions initially effective to produce substantial oxidation only in the presence of ozone, until the saponification number of the partially oxidized wax is at least about 10 mg. of KOH per gram; and then continuing the oxidation under substantially similar conditions but in the absence of ozone.

4. Method for partially oxidizing hydrocarbon materials which comprises: contacting hydrocarbon materials in liquid phase in a first oxidation zone with a free-oxygen containing gas under partial oxidation conditions; supplying ozone to said first oxidation zone from an ozone source during said contacting, until the saponification number of the partially oxidized hydrocarbon materials is at least about 10 mg. of KOH per gram; diverting ozone from said source to a second oxidation zone; contacting hydrocarbon materials in liquid phase in said second oxidation zone with a free-oxygen containing gas under partial oxidation conditions in the presence of the diverted ozone; and continuing the oxidation in said first oxidation zone by contacting the liquid materials with a free-oxygen containing gas under partial oxidation conditions in the absence of ozone.

References Cited in the file of this patent

UNITED STATES PATENTS

| 1,941,010 | James | Dec. 26, 1933 |
| 2,119,940 | Carr et al. | June 7, 1938 |
| 2,610,974 | Nelson | Sept. 16, 1952 |
| 2,674,613 | Nelson | Apr. 6, 1954 |

FOREIGN PATENTS

| 16,182 | Great Britain | 1905 |